(12) United States Patent
Neter (10) Patent No.: US 8,845,321 B2
(45) Date of Patent: Sep. 30, 2014

(54) SPLIT THREAD INSERT

(75) Inventor: Witold Neter, Newnan, GA (US)

(73) Assignee: Mold-Masters (2007) Limited, Georgetown, ON (CA)

( * ) Notice: Subject to any disclaimer, the term of this patent is extended or adjusted under 35 U.S.C. 154(b) by 114 days.

(21) Appl. No.: 13/409,799

(22) Filed: Mar. 1, 2012

(65) Prior Publication Data

US 2013/0230616 A1 Sep. 5, 2013

(51) Int. Cl.
*B29C 45/73* (2006.01)

(52) U.S. Cl.
USPC .......................................... 425/552; 249/79

(58) Field of Classification Search
CPC .................. B29C 45/7312; B29C 2045/7312; B29C 2045/7318
USPC ............................................ 425/552; 249/79
See application file for complete search history.

(56) References Cited

U.S. PATENT DOCUMENTS

| | | | |
|---|---|---|---|
| 5,599,567 A | 2/1997 | Gellert | |
| 5,855,933 A | 1/1999 | Schmetz | |
| 5,930,882 A | 8/1999 | Gellert | |
| 6,112,804 A | 9/2000 | Sachs et al. | |
| 6,176,700 B1 * | 1/2001 | Gellert | 425/547 |
| RE38,396 E * | 1/2004 | Gellert | 29/411 |
| 7,234,930 B2 | 6/2007 | Niewels et al. | |
| 7,377,767 B2 | 5/2008 | Dubuis et al. | |
| 7,575,429 B2 | 8/2009 | Mai et al. | |
| 7,588,439 B2 | 9/2009 | Mai et al. | |
| 7,717,697 B2 | 5/2010 | Hutchinson et al. | |
| 8,002,540 B2 | 8/2011 | Neter et al. | |
| 8,038,434 B2 | 10/2011 | Zuffa et al. | |
| 2002/0175265 A1 * | 11/2002 | Bak et al. | 249/79 |
| 2005/0276879 A1 | 12/2005 | Niewels et al. | |
| 2006/0283210 A1 | 12/2006 | Dubuis et al. | |
| 2008/0138455 A1 | 6/2008 | Hutchinson et al. | |
| 2008/0277820 A1 | 11/2008 | Zuffa et al. | |
| 2009/0162473 A1 | 6/2009 | Neter et al. | |
| 2009/0214890 A1 | 8/2009 | Lowney et al. | |

FOREIGN PATENT DOCUMENTS

CA 2 684 154 6/2010
DE 102007024744 A1 * 1/2008

OTHER PUBLICATIONS

Partial machine translation of DE 102007024744 A1 dated Jan. 2008 obtained from the esp@ce website.*
"EP Search Report", EP Appl. No. 13 15 7437.8, Jul. 12, 2013.

* cited by examiner

*Primary Examiner* — Robert B Davis
(74) *Attorney, Agent, or Firm* — Medler Ferro PLLC (57) ABSTRACT

A split thread insert is disclosed with integral cooling channels utilized for the continuous internal circulation of cooling fluid around a molding surface of the split thread insert, wherein the molding surface forms a neck area of a preform during an injection molding process. The molding surface of the split thread insert is semi-circular with a profile corresponding with a threaded area of the preform. The split thread insert is assembled from two or more cut pieces, wherein at least one of the cut pieces includes a curved groove formed therein proximate the molding surface for forming a curved cooling fluid channel when the cut pieces are joined to form the split thread insert. The cooling fluid channel includes a flow diverter positioned therein for defining a portion of a continuous cooling fluid circuit of the split thread insert.

9 Claims, 7 Drawing Sheets

SPLIT THREAD INSERT

FIELD OF THE INVENTION

The invention relates generally to injection molding systems and, in particular, to a neck ring or split thread insert for use in molding preforms.

BACKGROUND OF THE INVENTION

In the art of injection molding, a typical injection mold will contain one or more mold cores and cavities that correspond to the shape of the molded article being produced. A melt stream of moldable material is injected from an injection molding machine into the mold cavities through a hot runner system, where it is allowed to solidify for a period of time before the mold is opened and the newly molded parts are ejected. One of the most significant factors in affecting the overall cycle time required to produce one or a plurality of molded articles is the time required to solidify or cool the newly molded articles within the mold cavity before the parts are ejected.

In injection molding applications such as the molding of polyethylene terephthalate (PET) preforms, the ability to rapidly cool the molded articles in the mold is of utmost importance since the newly molded preforms are in many instances removed from the mold by a robotic take-out plate as soon as they have solidified to a point where they can be handled without being damaged, and are then further cooled for a number of additional molding cycles by a post mold cooling apparatus. Generally, post mold cooling systems are configured to cool only the interior and exterior of the body of the preform and as such the molding cycle time is generally limited by the ability to sufficiently cool the thread/neck portion of the preform while it is still in the mold.

In PET molding, an assembly of components, known in the art as a mold stack, defines the cavity in which the preform is molded. The threaded neck portion of the preform is formed within the mold cavity by a complementary pair of mating mold halves known as neck rings or split thread inserts. Along with providing the molding surface which defines the threaded neck portion of the preform, the pair of split thread inserts are also used to strip the preform from the mold core during ejection of the preform from the mold, and are further used to align the core and cavity with respect to one another when the two halves of the mold are clamped together.

Due to their location within the mold stack, along with the various functions required of the split thread inserts, mold builders face great difficulty in providing adequate cooling within the split thread inserts adjacent the molding surface. Cooling channels that are usually manufactured at some distance from the molding surface may not have a uniform distribution around the molding surface. Inadequate and uneven cooling may result in a molded preform with quality problems such as an undesirable oval shape, dimensions out of specification, and deformations. In order to avoid these problems, cycle time is usually increased to allow longer cooling and more plastic solidification. However, longer cycle times impacts the manufacturing process by causing lower productivity and increases the cost of plastic parts produced.

There are many ways of designing and manufacturing split thread inserts with cooling channels. Some manufacturers attempt to provide uniform cooling circuitry inside of each of the split thread inserts by forming the split thread insert from more than one piece with the mating surfaces between the pieces sometimes having a very complex cut, which can make joining the pieces together to form the split thread insert more difficult. Such multi-piece split thread inserts may not be cost effective or practical for forming smaller molded parts due to the added complexity of the design/shape. As such a need still exists in the art for split thread inserts having internal cooling circuitry that are relatively simple to manufacture and which can provide rapid cooling of the threaded neck portion of any size preform.

BRIEF SUMMARY OF THE INVENTION

Embodiments hereof are directed to a split thread insert with integral cooling channels utilized for the continuous internal circulation of cooling fluid around a molding surface of the split thread insert, wherein the molding surface forms a neck area of a preform during an injection molding process. The molding surface of the split thread insert is semi-circular with a profile corresponding with a threaded area of the preform. The split thread insert is assembled from two or more cut pieces, wherein at least one of the cut pieces includes a curved groove formed therein proximate the molding surface for forming a curved cooling fluid channel when the cut pieces are joined to form the split thread insert. In various embodiments, the cooling fluid channel includes a flow diverter positioned therein for defining a portion of a continuous cooling fluid circuit of the split thread insert.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although the description of embodiments hereof are in the context of forming split thread inserts with integral cooling channels, the invention may also be used other molding parts and applications where it is deemed useful. Furthermore, there is no intention to be bound by any expressed or implied theory presented in the preceding technical field, background, brief summary or the following detailed description.

Figure 1:
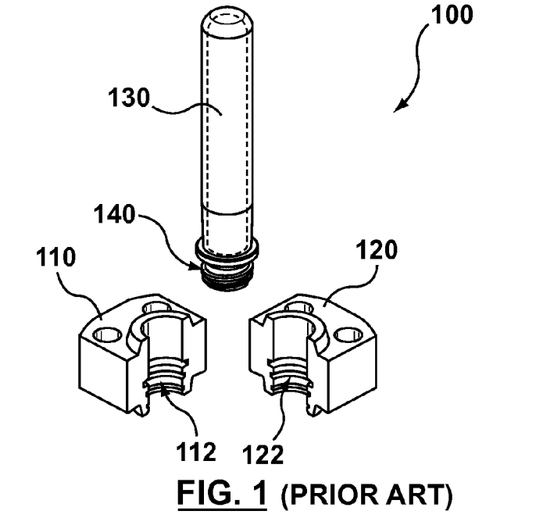
FIG. 1 depicts a perspective view of a prior art device having a pair of split thread inserts that have been separated along a parting line after forming a solidified plastic preform.

By way of illustration of the general technology in this field, FIG. 1 depicts a perspective view of a prior art device 100 having a pair of split thread inserts 110, 120 that have been separated along a parting line after forming a solidified plastic preform 130. The internal contour of respective thread molding surfaces 112, 122 of split thread inserts 110, 120, respectively, reflects the external geometry of a thread area 140 of the plastic preform 130. The pair of split thread inserts 110, 120 close together along with other elements of the mold prior to an injection of a molten plastic being made, and open up to release the solidified plastic preform 130 as would be understood by one of ordinary skill in the art.

Figure 2:
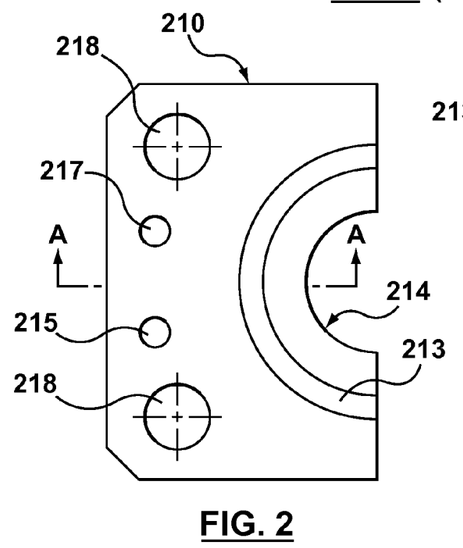
FIG. 2 illustrates a top view of a split thread insert in accordance with an embodiment hereof.
Figure 2A:
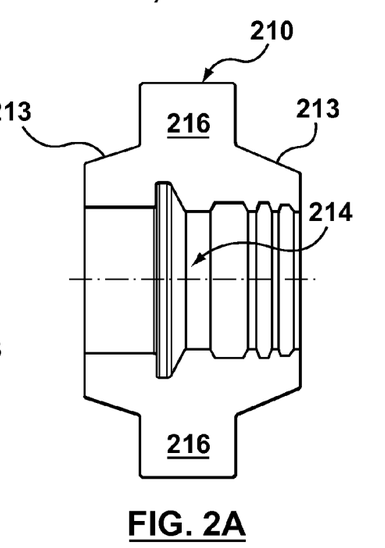
FIG. 2A illustrates a side view of the split thread insert of FIG. 2.

FIG. 2 illustrates a top view of a split thread insert 210 in accordance with an embodiment hereof. Split thread insert 210 is one half of a pair of split thread inserts that together form a threaded neck region of a plastic preform as would be understood by one of ordinary skill in the art. FIG. 2A illustrates a side view of split thread insert 210 of FIG. 2 showing parting or closing face 216 and molding surface 214 thereof, with molding surface 214 being contoured to form the neck region of a molded preform having a thread section. Mounting holes 218, cooling fluid channel inlet and outlet 215, 217 and the contours of locking or alignment tapers 213 of split thread insert 210 are shown in FIGS. 2 and 2A.

Figure 3:
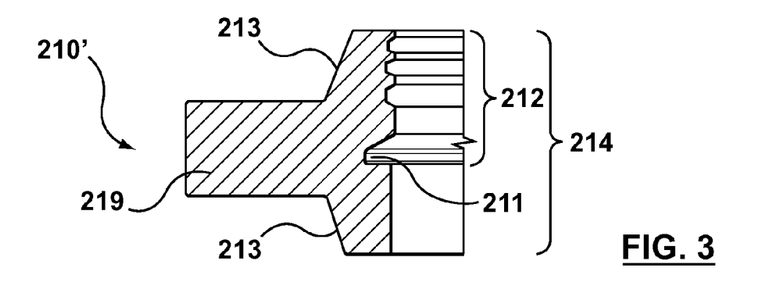
FIG. 3 is a sectional view of a split thread insert subcomponent for forming the split thread insert of FIG. 2.

FIG. 3 is a sectional view of a split thread insert subcomponent 210' showing a section thereof taken along a line identical to line A-A of split thread insert 210 of FIG. 2. Split thread insert subcomponent 210' shows a section of split thread insert 210 prior to formation of mating surfaces and a cooling circuit as discussed in detail below with respect to various embodiments hereof. In an initial step of manufacturing split thread insert 210, split thread insert subcomponent 210' is formed with opposing locking tapers 213 that end at a mounting flange 219 thereof. A profile of split thread insert subcomponent 210' defines molding surface 214 of split thread insert 210 for forming a threaded neck portion of a preform and includes a support ledge contour detail 211 and a thread contour detail 212.

Figure 4:
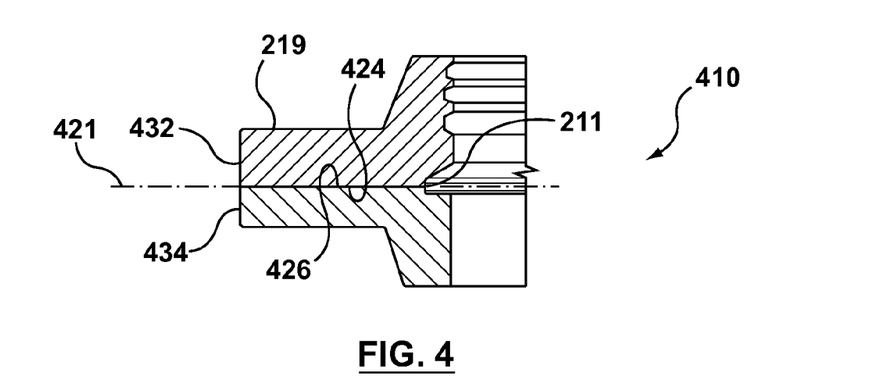
FIG. 4 is the split thread insert subcomponent shown in FIG. 3 in accordance with an embodiment hereof having mating surfaces created there through in parallel to a mounting flange with the mating surfaces being made through the split thread insert subcomponent at a support ledge of the molding surface.
Figure 5:
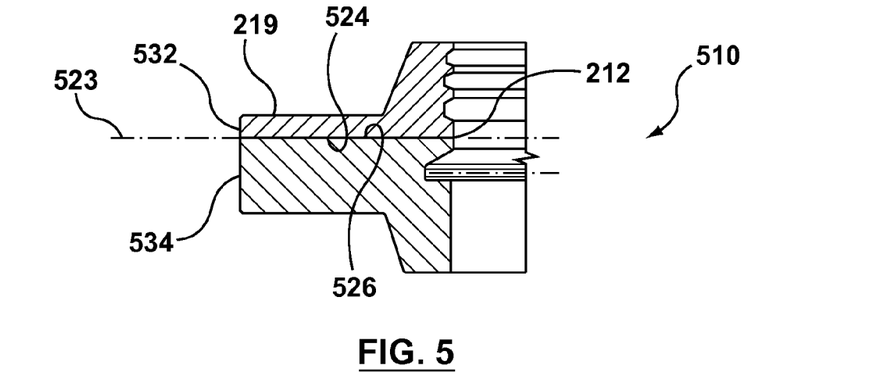
FIG. 5 is the split thread insert subcomponent shown in FIG. 3 in accordance with another embodiment hereof having mating surfaces created there through in parallel to a mounting flange with the mating surfaces being made through the split thread insert subcomponent proximate a thread area of the molding surface.
Figure 6:
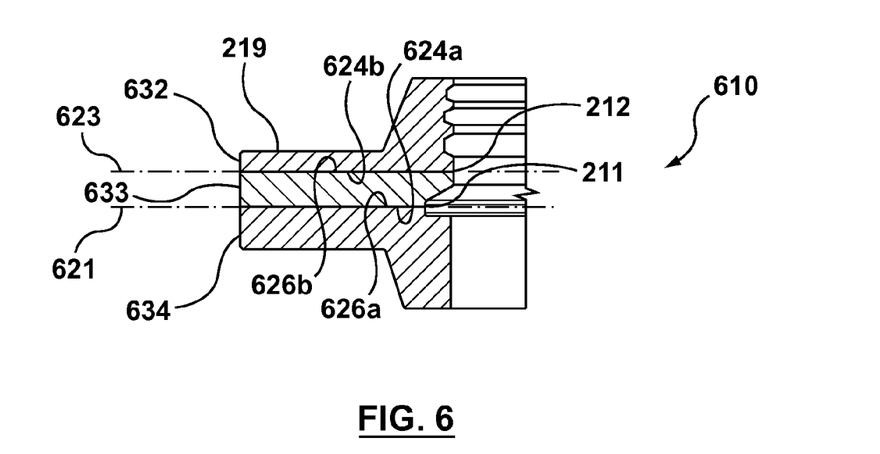
FIG. 6 is the split thread insert subcomponent shown in FIG. 3 in accordance with another embodiment hereof with two sets of mating surfaces created there through in parallel to a mounting flange with one set of mating surfaces being made proximate a thread area of the molding surface and a second set of mating surfaces being made at a support ledge of the molding surface.

FIGS. 4 and 5 depict various embodiments of split thread insert subcomponent 210' after having been cut into two pieces to have a mating plane 421, 523, respectively, with FIG. 6 depicting an embodiment of split thread insert subcomponent 210' after having been cut into three pieces to have two mating planes 621, 623. Each of the mating planes 421, 523, 621, 623 is produced by a cut that is made substantially parallel with a top surface of mounting flange 219, with each cut being made at a different level of split thread insert subcomponent 210' to offer different cooling solutions. Mating surfaces 424, 426 are created by the cut that forms mating plane 421, mating surfaces 524, 526 are created by the cut that forms mating plane 523, and a first set of mating surfaces 624a, 626a is created by the cut that forms mating plane 621 and a second set of mating surfaces 624b, 626b is created by the cut that forms mating plane 623.

FIG. 4 depicts a split thread insert subcomponent 410 in accordance with an embodiment hereof, which is split thread insert subcomponent 210' having mating surfaces 424, 426 formed there through. Mating surfaces 424, 426 are created to meet on mating plane 421 that intersects support ledge contour 211 of molding surface 214. The cut made to form mating surfaces 424, 426 divides split thread insert subcomponent 410 into an upper piece 432 and a lower piece 434. The terms "upper" and "lower" are used throughout the specification only to refer to the relative positions of the two pieces with respect to each other as shown in the figures contained herein, and may or may not correspond with the orientation of the split thread insert once mounted within an injection molding machine.

FIG. 5 depicts a split thread insert subcomponent 510 in accordance with another embodiment hereof, which is split thread insert subcomponent 210' having mating surfaces 524, 526 formed there through. Mating surfaces 524, 526 are created to meet on mating plane 523 that intersects thread contour 212 of molding surface 214, such that mating line 523 can be referred to as having been made on a level of split thread insert subcomponent 210' that is above a level of split thread insert subcomponent 210' through which mating plane 421 was made in the embodiment of FIG. 4. The cut made to form mating surfaces 524, 526 divides split thread insert subcomponent 510 into an upper piece 532 and a lower piece 534.

FIG. 6 depicts a split thread insert subcomponent 610 in accordance with another embodiment hereof, which is split thread insert subcomponent 210' having two sets of mating surfaces 624a, 626a and 624b, 626b, respectively, formed there through. Mating surfaces 624a, 626a are created to meet on mating plane 621 that intersects support ledge contour 211 of molding surface 214 with mating surfaces 624b, 626b being created to meet on mating plane 623 that intersects thread contour 212 of molding surface 214. As such, mating plane 623 can be referred to as having been made on a level of split thread insert subcomponent 210' that is above a level in which mating plane 621 was made. The cuts made to form mating surfaces 624a, 626a and 624b, 626b divide split thread insert subcomponent 610 into an upper piece 632, a middle piece 633 and a lower piece 634. In an embodiment hereof, subcomponent 610 may be utilized to form a more complex multi-level cooling circuitry, as discussed further below. It would be understood by one of ordinary skill in the art after considering the contents hereof that a cutting plane may be made through any level of split thread insert component 210', horizontally (as shown in FIGS. 4-6) or at any angle necessary to accommodate the cooling needs of a particular molding application.

Figure 7:
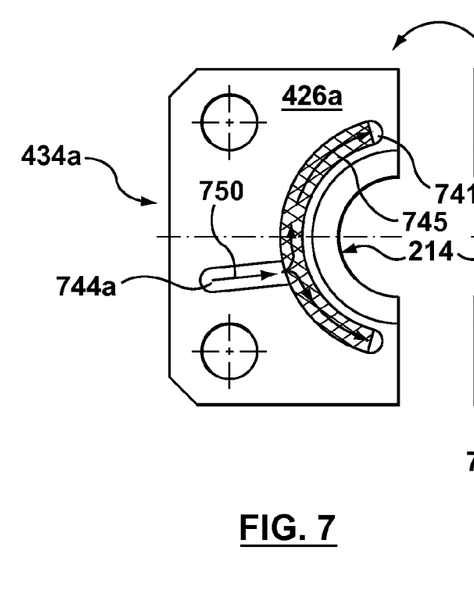
FIGS. 7 and 7A each depict a separate cut piece of the split thread insert subcomponent of FIG. 4 laid open next to each other to show the respective mating surfaces thereof, wherein a cooling circuit has been formed therein in accordance with an embodiment hereof.
Figure 7A:
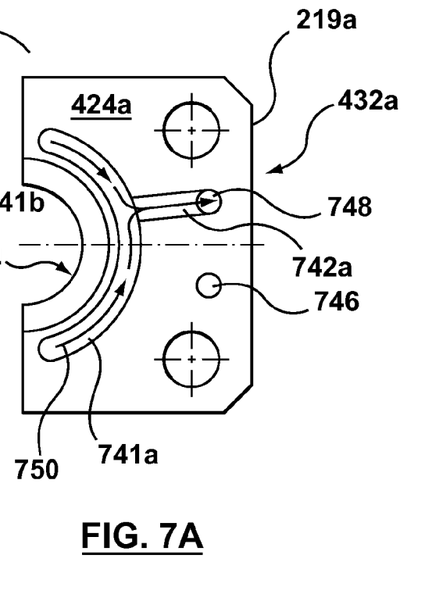

Two Piece Split Thread Insert Embodiment with a Perpendicular Groove Formed in Each Piece In accordance with an embodiment hereof, FIGS. 7 and 7A depict lower and upper pieces 434a, 432a, respectively, of split thread insert subcomponent 410 having been laid open next to each other to show the respective mating surfaces 426a, 424a thereof. Together FIGS. 7 and 7A depict lower and upper pieces 434a, 432a ready to be assembled together in the direction of the arrow to form split thread insert 710, which is shown in section in FIG. 8, in accordance with an embodiment hereof. In an embodiment, upper and lower pieces 432a, 434a of split thread insert 710 are joined together, preferably by the brazing process described below.

Figure 8:
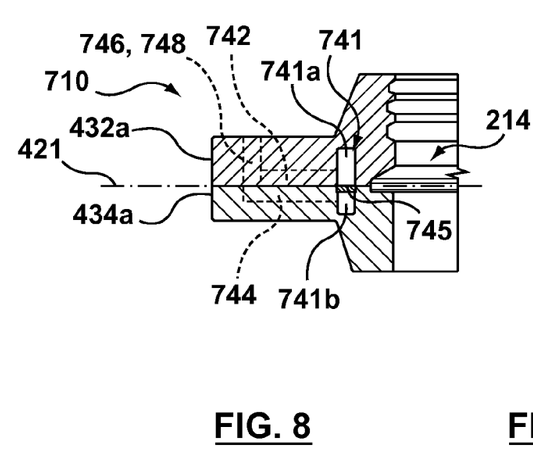
FIG. 8 depicts a sectional view of a split thread insert in accordance with an embodiment hereof that is formed by joining the cut pieces depicted in FIGS. 7 and 7A along the mating surfaces thereof.

A curved cooling channel 741 is formed within split thread insert 710 by the joining of upper piece 432a and lower piece 434a along mating surfaces 424a, 426a. More particularly, a curved groove 741a formed within upper piece 432a corresponds to and mates with a curved groove 741b formed within lower piece 434a to form curved cooling channel 741 that is positioned proximate to and substantially coaxial with curved molding surface 214. Curved grooves 741a, 741b are manufactured perpendicular to mating plane 421. In addition, an inlet groove 744a is formed within lower piece 434a and an outlet groove 742a is formed within upper piece 432a, each of which forms an inlet cooling channel 744 and an outlet cooling channel 742, respectively, when upper and lower pieces 432a, 434a are joined to form split thread insert 710. As well, inlet and outlet bores 746, 748 are made through a thickness of a mounting flange portion 219a of upper piece 432a such that within split thread insert 710, inlet cooling channel 744 extends between inlet bore 746 and curved cooling channel 741 while outlet cooling channel 742 extends between outlet bore 748 and curved cooling channel 741.

Figure 8A:
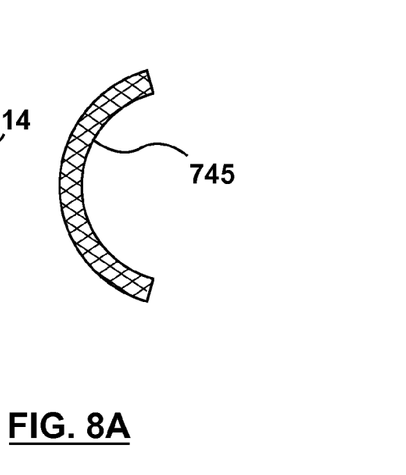
FIG. 8A depicts a flow diverter in accordance with an embodiment hereof.

In order to create a cooling circuit of split thread insert 710, prior to joining upper and lower pieces 432a, 434a, cooling channel grooves 741a, 741b are separated by a cooling fluid flow diverter 745, as shown in FIG. 7. FIG. 8A depicts a flat curved plate that forms flow diverter 745 in accordance with an embodiment hereof. In an embodiment, flow diverter 745 is formed of a material, such as a ceramic or metal, that can withstand the brazing or other joining process to be used, and can be a fine mesh. In embodiments hereof, flow diverter 745 may be formed of stainless steel or mold steel.

Flow diverter 745 is installed within a recess of lower piece 434a that has been machined within mating surface 426a along the curved edges of groove 741b, however this arrangement is by way of example and instead the recess may be formed within mating surface 424a of upper piece 432a in a similar manner. The recess allows a close fit of flow diverter 745, such that a surface of flow diverter 745 is substantially flush or even with mating surface 424a to provide an uninterrupted and flat surface with mating surface 426a, which permits ease in joining of mating surfaces 424a, 426a when forming split thread insert 710.

A length of flow diverter 745 is selected to be of a slightly shorter dimension than a length of curved cooling channel 741 such that each end of flow diverter 745 is spaced from a corresponding end of cooling channel 741 such that a cooling fluid opening exists therebetween. As noted above, cooling channel 741 is formed by mating cooling channel grooves 741a, 741b. The length of flow diverter 745 is selected to define a portion of the cooling circuit by permitting cooling fluid to circulate about both ends of flow diverter 745, with the circulation being represented by arrows 750 in FIGS. 7 and 7A. The cooling circuit in the configuration shown operates as follows: a cooling fluid is introduced into split thread insert 710 via inlet bore 746 and is fluidly communicated to cooling channel groove 741b of cooling channel 741 through inlet channel 744; the cooling fluid then flows through cooling channel groove 741b to traverse an opening at each end of flow diverter 745 and thereby simultaneously enter each end of cooling channel groove 741a of cooling channel 741; and thereafter the cooling fluid circulates through cooling channel groove 741a and enters outlet channel 742 to exit split thread insert 710 via outlet bore 748. In another embodiment, depending on the design of the mold, the cooling fluid flow direction may be reversed.

Figures 9, 9A:
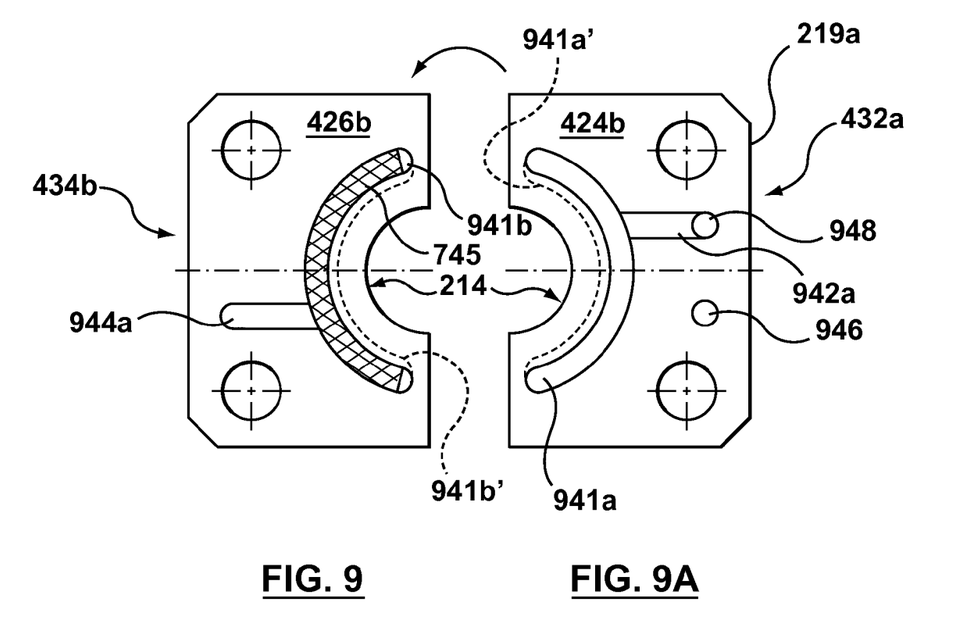
FIGS. 9 and 9A each depict a separate cut piece of the split thread insert subcomponent of FIG. 4 laid open next to each other to show the respective mating surfaces thereof, wherein a cooling circuit has been formed therein in accordance with another embodiment hereof.

Two Piece Split Thread Insert Embodiment with an Angled Groove Formed in Each Piece In accordance with another embodiment hereof, FIGS. 9 and 9A depict lower and upper pieces 434b, 432b, respectively, of split thread insert subcomponent 410 having been laid open next to each other to show the respective mating surfaces 426b, 424b thereof. Together FIGS. 9 and 9A depict lower and upper pieces 434b, 432b ready to be assembled together in the direction of the arrow to form split thread insert 1010, which is shown in section in FIG. 10, in accordance with an embodiment hereof. In an embodiment, upper and lower pieces 432b, 434b of split thread insert 1010 are joined together, preferably by the brazing process described below.

Figure 10:
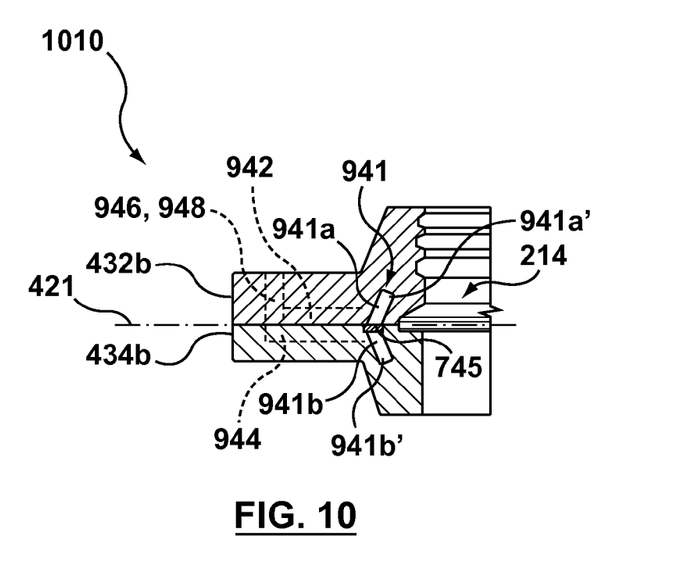
FIG. 10 depicts a sectional view of a split thread insert in accordance with another embodiment hereof that is formed by joining the cut pieces depicted in FIGS. 9 and 9A along the mating surfaces thereof.

A curved cooling channel 941 is formed within split thread insert 1010 by the joining of upper piece 432b and lower piece 434b along mating surfaces 424b, 426b. More particularly, a curved groove 941a formed within upper piece 432b corresponds to and mates with a curved groove 941b formed within lower piece 434b to form curved cooling channel 941 that is positioned proximate to curved molding surface 214. In contrast to the previous embodiment, each of corresponding curved grooves 941a, 941b is manufactured at an acute angle relative to mating plane 421 such that a trough 941a', 941b' of each groove 941a, 941b is positioned closer to the molding surface 214 than the perpendicularly made grooves 741a, 741b.

Similar to the previous embodiment, an inlet groove 944a is formed within lower piece 434b and an outlet groove 942a is formed within upper piece 432b, each of which forms an inlet cooling channel 944 and an outlet cooling channel 942, respectively, when upper and lower pieces 432b, 434b are joined to form split thread insert 1010. As well, inlet and outlet bores 946, 948 are made through a thickness of a mounting flange portion 219a of upper piece 432b such that within split thread insert 1010, inlet cooling channel 944 extends between inlet bore 946 and curved cooling channel 941 while outlet cooling channel 942 extends between outlet bore 948 and curved cooling channel 941. In order to create a cooling circuit within split thread insert 1010, prior to joining upper and lower pieces 432b, 434b, cooling channel grooves 941a, 941b are separated by flow diverter 745 in the same manner as described with reference to the previous embodiment. Accordingly in the embodiment shown in FIG. 10, cooling fluid enters split thread insert 1010 through inlet channel 944 to circulate first through angled cooling channel groove 941b of cooling channel 941 and then through angled cooling channel groove 941a of cooling channel 941 by traversing an opening at each end of flow diverter 745 and thereby simultaneously entering each end of angled cooling channel groove 941a, after which the cooling fluid circulates and exits split thread insert 1010 via outlet channel 942.

Figure 11:
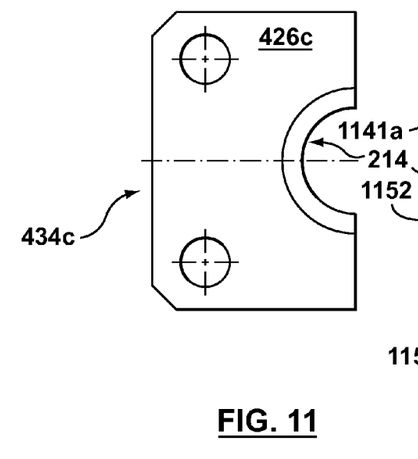
FIGS. 11 and 11A each depict a separate cut piece of the split thread insert subcomponent of FIG. 4 laid open next to each other to show the respective mating surfaces thereof, wherein a cooling circuit has been formed therein in accordance with another embodiment hereof.
Figure 11A:
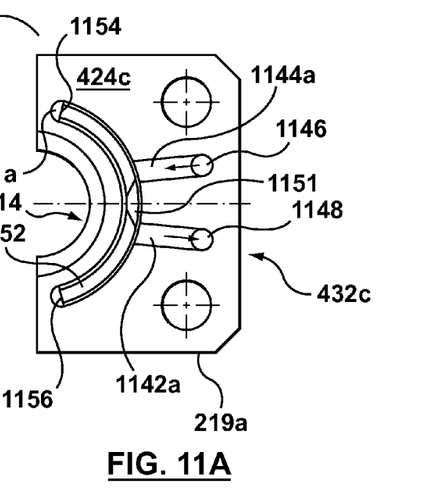

Two Piece Split Thread Insert Embodiment with a Perpendicular Groove Formed in One Piece In accordance with another embodiment hereof, FIGS. 11 and 11A depict lower and upper pieces 434c, 432c, respectively, of split thread insert subcomponent 410 having been laid open next to each other to show the respective mating surfaces 426c, 424c thereof. Together FIGS. 11 and 11A depict lower and upper pieces 434c, 432c ready to be assembled together in the direction of the arrow to form split thread insert 1210, which is shown in section in FIG. 12, in accordance with an embodiment hereof. In an embodiment, upper and lower pieces 432c, 434c of split thread insert 1210 are joined together, preferably by the brazing process described below.

Figure 12:
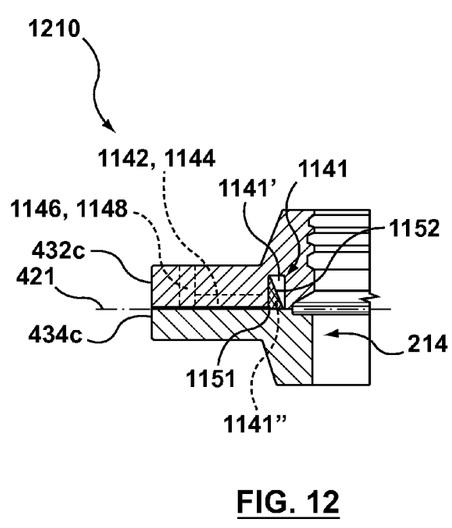
FIG. 12 depicts a sectional view of a split thread insert in accordance with another embodiment hereof that is formed by joining the cut pieces depicted in FIGS. 11 and 11A along the mating surfaces thereof.

A curved cooling channel 1041 is formed within split thread insert 1210 by the joining of upper piece 432c and lower piece 434c along mating surfaces 424c, 426c. More particularly, a curved groove 1141a is formed within only upper piece 432c to form curved cooling channel 1141 when curved groove 1141a is seated against a corresponding area of mating surface 426c to be covered thereby when upper and lower pieces 432c, 434c are joined to form split thread insert 1210. With reference to FIG. 12, curved groove 1141a is manufactured perpendicular to mating plane 421 and is positioned within upper piece 432c to be proximate to and substantially coaxial with curved molding surface 214.

In addition, an inlet groove 1144a and an outlet groove 1142a are formed within upper piece 432c, each of which forms an inlet cooling channel 1144 and an outlet cooling channel 1142, respectively, when each groove is seated against a corresponding area of mating surface 426c to be covered thereby when upper and lower pieces 432c, 434c are joined to form split thread insert 1210. As well, inlet and outlet bores 1146, 1148 are made through a thickness of a mounting flange portion 219a of upper piece 432c such that within split thread insert 1210, inlet cooling channel 1144 extends between inlet bore 1146 and curved cooling channel 1141 while outlet cooling channel 1142 extends between outlet bore 1148 and curved cooling channel 1141.

Figure 12A:
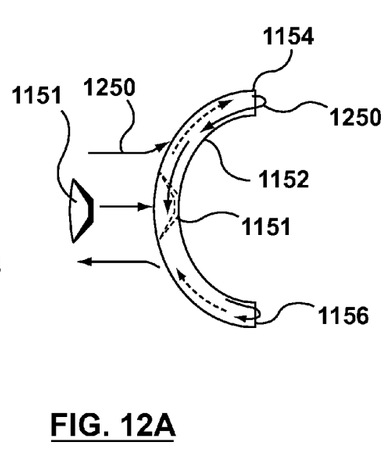
FIG. 12A depicts a flow diverter and support in accordance with another embodiment hereof that is used in the embodiment shown in FIGS. 11, 11A and 12.

In order to create a continuous cooling circuit within split thread insert 1210, prior to joining upper and lower pieces 432c, 434c, cooling channel groove 1141a is separated into upper and lower segments 1141', 1141" by a cooling fluid flow diverter 1151 with diverter support 1152, as shown with reference to FIGS. 11A and 12. FIG. 12A depicts flow diverter 1151 and diverter support 1152 in accordance with an embodiment hereof. In an embodiment, flow diverter 1151 and diverter support 1152 maybe be joined prior to being placed within curved groove 1141a or may be separately positioned within curved groove 1141a and then joined together by the brazing process used to join upper and lower pieces 432c, 434c. In an embodiment, flow diverter 1151 and diverter support 1152 are formed of a ceramic or metal, with flow diverter 1151 being a V-shaped sheet or block and diverter support 1152 being a thin rectangular sheet. Segments 1141', 1141" of groove 1141a may be described as being defined between surfaces of flow diverter 1151 with diverter support 1152, groove 1141a and the corresponding area of mating surface 426c that covers groove 1141a. Flow diverter 1151 acts as a baffle that is positioned within cooling channel groove 1141a between inlet and outlet grooves 1144a, 1142a with diverter support 1152 positioned there over to extend diagonally within cooling channel groove 1141a.

A length of diverter support 1152 is selected to be of a slightly shorter dimension than a length of curved cooling channel 1141 such that each end of diverter support 1152 is spaced from a corresponding end of cooling channel 1141 such that a cooling fluid opening exists therebetween. Stated another way, the length of diverter support 1152 is selected to allow cooling fluid to circulate about both ends thereof when installed within groove 1141a, with the circulation there around being represented by arrows 1250 in FIG. 12A. The cooling circuit in the configuration shown operates as follows: cooling fluid is introduced via inlet bore 1146 into split thread insert 1210 and flows through inlet channel 1144 to be directed by flow diverter 1151 to circulate through a first portion of lower segment 1141" of cooling channel 1141 and then through an entire length of upper segment 1141' of cooling channel 1141 by traversing an opening at a first end 1154 of diverter support 1152; and thereafter the cooling fluid flows to a second portion of lower segment 1141" of cooling channel 1141 by traversing an opening at a second end 1156 of diverter support 1152, after which the cooling fluid exits split thread insert 1210 via outlet channel 1142 and outlet bore 1148. In another embodiment, depending on the design of the mold, the cooling fluid flow direction may be reversed.

Figures 13, 13A:
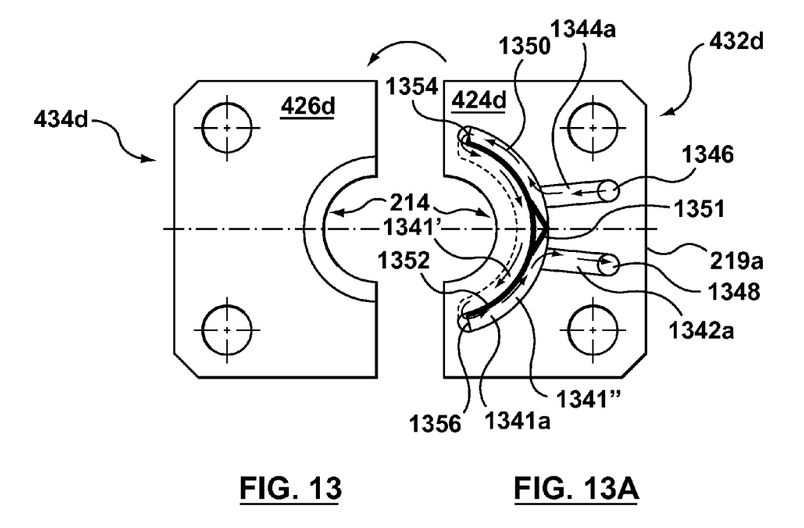
FIGS. 13 and 13A each depict a separate cut piece of the split thread insert subcomponent of FIG. 4 laid open next to each other to show the respective mating surfaces thereof, wherein a cooling circuit has been formed therein in accordance with another embodiment hereof.

Two Piece Split Thread Insert Embodiment with an Angled Groove Formed in One Piece In accordance with another embodiment hereof, FIGS. 13 and 13A depict lower and upper pieces 434d, 432d, respectively, of split thread insert subcomponent 410 having been laid open next to each other to show the respective mating surfaces 426d, 424d thereof. Together FIGS. 13 and 13A depict lower and upper pieces 434d, 432d ready to be assembled together in the direction of the arrow to form split thread insert 1410, which is shown in section in FIG. 14, in accordance with an embodiment hereof. In an embodiment, upper and lower pieces 432d, 434d of split thread insert 1410 are joined together, preferably by the brazing process described below.

Figure 14:
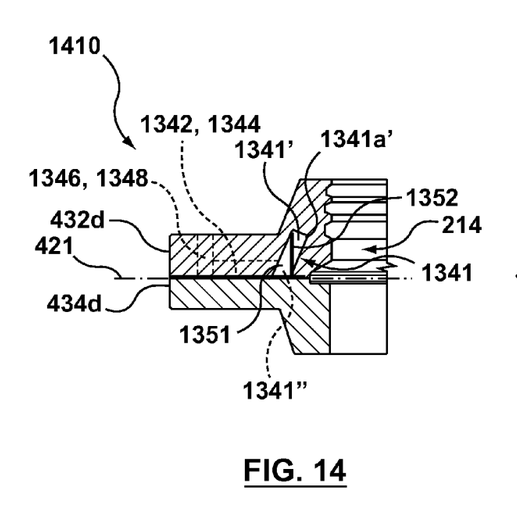
FIG. 14 depicts a sectional view of a split thread insert in accordance with another embodiment hereof that is formed by joining the cut pieces depicted in FIGS. 13 and 13A along the mating surfaces thereof.

A curved cooling channel 1341 is formed within split thread insert 1410 by the joining of upper piece 432d and lower piece 434d along mating surfaces 424d, 426d. More particularly, a curved groove 1341a is formed within only upper piece 432d to form curved cooling channel 1341 when curved groove 1341a is seated against a corresponding area of mating surface 426d to be covered thereby when upper and lower pieces 432d, 434d are joined to form split thread insert 1410. With reference to FIG. 14, curved groove 1341a is manufactured at an acute angle relative to mating plane 421 such that a trough 1341a' thereof is positioned closer to molding surface 214 than the perpendicularly made groove 1141a of FIG. 11A.

In addition, an inlet groove 1344a and an outlet groove 1342a are formed within upper piece 432d, each of which forms an inlet cooling channel 1344 and an outlet cooling channel 1342, respectively, when each groove is seated against a corresponding area of mating surface 426d to be covered thereby when upper and lower pieces 432d, 434d are joined to form split thread insert 1410. As well, inlet and outlet bores 1346, 1348 are made through a thickness of a mounting flange portion 219a of upper piece 432d such that within split thread insert 1410, inlet cooling channel 1344 extends between inlet bore 1346 and curved cooling channel 1341 while outlet cooling channel 1342 extends between outlet bore 1348 and curved cooling channel 1341.

Figure 14A:
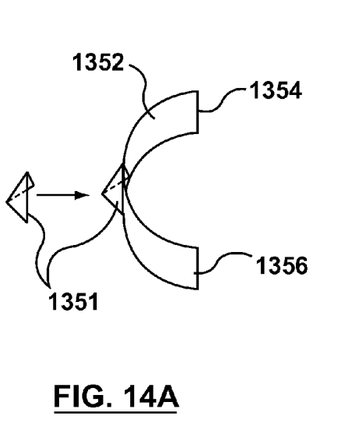
FIG. 14A depicts a flow diverter and support in accordance with another embodiment hereof that is used in the embodiment shown in FIGS. 13, 13A and 14.

In order to create a cooling circuit of split thread insert 1410, prior to joining upper and lower pieces 432d, 434d, angled cooling channel groove 1341a is separated into segments 1341', 1341" by a cooling fluid flow diverter 1351 and diverter support 1352, as shown with reference to FIGS. 13A and 14. FIG. 14A depicts flow diverter 1351 and diverter support 1352 in accordance with another embodiment hereof. In embodiments hereof, flow diverter 1351 and diverter support 1352 maybe be joined prior to being placed within curved groove 1341a or may be separately positioned within curved groove 1341a and then joined together by the brazing process used to join upper and lower pieces 432d, 434d. In an embodiment, flow diverter 1351 and diverter support 1352 are formed of a ceramic or metal, with flow diverter 1351 being a folded triangular wedge shaped piece formed from a thin metallic sheet and diverter support 1352 being a thin rectangular sheet. Segments 1341', 1341" of groove 1341a may be described as being defined between surfaces of flow diverter 1351 with diverter support 1352, groove 1341a and the corresponding area of mating surface 426d that covers groove 1341a. Flow diverter 1351 acts as a baffle that is positioned within cooling channel groove 1341a between inlet and outlet grooves 1344a, 1342a with diverter support 1352 positioned there against to divide angled cooling channel groove 1341a into segments 1341', 1341".

A length of diverter support 1352 is selected to be of a slightly shorter dimension than a length of curved cooling channel 1341 such that each end of diverter support 1352 is spaced from a corresponding end of cooling channel 1341 such that a cooling fluid opening exists therebetween. As noted above, cooling channel 1341 is formed by angled cooling channel groove 1341a. The length of diverter support 1352 is selected to allow cooling fluid to circulate about both ends thereof when installed within groove 1341a, with the circulation there around being represented by arrows 1350 in FIG. 13A. In the configuration shown, cooling fluid enters split thread insert 1310 through inlet channel 1344 to be directed by flow diverter 1351 to circulate through a first portion of segment 1341" of cooling channel 1341 and then through segment 1341' of cooling channel 1341 by traversing an opening at a first end 1354 of diverter support 1352 and thereafter enters a second portion of lower segment 1341" of cooling channel 1341 by traversing an opening at a second end 1356 of diverter support 1352, after which the cooling fluid exits split thread insert 1410 via outlet channel 1342. In another embodiment, depending on the design of the mold, the cooling fluid flow direction may be reversed.

Figures 16, 16A:
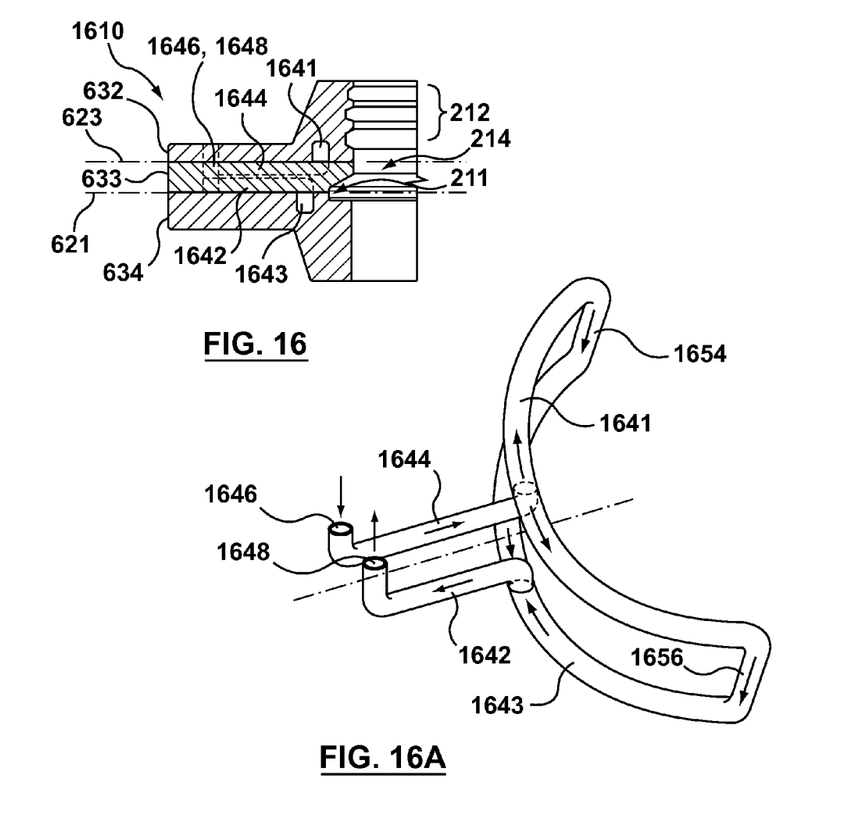
FIG. 16 depicts a sectional view a split thread insert having radially offset cooling channels in accordance with another embodiment hereof that was formed from the split thread insert subcomponent of FIG. 6.
FIG. 16A is a schematic drawing illustrating a pattern of circulating cooling fluid within the split thread insert of FIG. 16.

Three Piece Split Thread Insert Embodiment with a Perpendicular Groove Formed in Each of an Upper and Lower Piece FIG. 16 depicts a sectional view of a split thread insert 1610 having radially offset cooling channels 1641, 1643 in accordance with another embodiment hereof that was formed from split thread insert subcomponent 610 of FIG. 6. Split thread insert 1610 includes upper piece 632, middle piece 633 and lower piece 634. A cooling circuit is formed within split thread insert 1610 with curved cooling channels 1641, 1643 being formed by the joining of upper piece 632, middle piece 633 and lower piece 634 along the mating surfaces thereof. A first curved groove is formed within upper piece 632 and a second curved groove is formed within lower piece 634 to form respective curved cooling channels 1641, 1643 when the first and second grooves are seated against respective corresponding areas of mating surfaces 626b, 624a of middle piece 633 to be covered thereby when upper piece 632, middle piece 633 and lower piece 634 are joined to form split thread insert 1210. As well, inlet and outlet bores 1646, 1648 are made through a thickness of a mounting flange portion of upper piece 632 and middle piece 633 such that within split thread insert 1610, inlet cooling channel 1644 extends between inlet bore 1646 and curved cooling channel 1641 while outlet cooling channel 1642 extends between outlet bore 1648 and curved cooling channel 1643 With reference to FIG. 16, curved cooling channel 1641 is manufactured perpendicular to mating plane 623 and curved cooling channel 1643 is manufactured perpendicular to mating plane 621 so that each cooling channel is positioned to be proximate to and substantially coaxial with curved molding surface 214 but to be radially displaced with respect to each other. In this manner, curved cooling channel 1641 is disposed within split thread insert 1610 close to the thread contour 212 of molding surface 214 and curved cooling channel 1643 is disposed within split thread insert 1610 close to support ledge contour 211 of molding surface 214 to provide uniform cooling thereto.

FIG. 16A is a schematic drawing illustrating a pattern of circulating cooling fluid within the cooling circuit of split thread insert 1610, which includes radially displaced cooling channels 1641, 1643 to provide more uniform cooling fluid distribution proximate molding surface 214. In the configuration shown, cooling fluid enters split thread insert 1610 through inlet bore 1646 and enters inlet channel 1644 to circulate through cooling channel 1641 and then through cooling channel 1643 by traversing angled end channels 1654, 1656 at either end of cooling channel 1641, after which the cooling fluid exits split thread insert 1610 via outlet channel 1642 and outlet bore 1648.

Brazing Process

Brazing processes are well known for use in producing components to be used in the injection molding industry and many complex parts can be joined using this technology. Generally during the brazing process parts need to be close fitted, assembled and heated to a temperature above the melting point of a filler metal. At this temperature, capillary action distributes the filler metal inside of the brazing joint. Depending on the application, different alloys are used as filler metals, which may contain nickel, iron, copper, silicon, or other materials. The filler metal may be in the form of a foil, powder, paste, cream, wire and may be shaped to match joining parts. To clean and to protect joints from oxidation at elevated temperature, suitable flux is applied before assembling parts. In most instances, the brazing process is performed in a vacuum or other environment preventing oxidation, like an environment of nitrogen, hydrogen, argon and the like.

In order to make a split thread insert in a more cost effective manner as well as to assure a long operational life without fluid leaks, embodiments hereof provide a manufacturing method that is readily repeatable for consistently producing a high quality split thread insert at a reasonable cost. In accordance with an embodiment hereof, a split thread insert subcomponent, such as split thread insert subcomponent 210', is formed with a desired profile and molding surface. The split thread insert subcomponent is than machine cut into two or more pieces, such as shown with reference to split thread subcomponents 410, 510, 610, by following a simple, flat mating plane, such as, for e.g., mating plane 421 of subcomponent 410, to form planar mating surfaces that run substantially parallel to a mounting flange of the split thread insert component. In an embodiment, the mating plane may intersect the molding surface in any selected area, for e.g., at a thread contour or a support ledge contour for molding a threaded neck region of a preform. When produced in accordance with a method hereof, the resulting cut pieces have flat planar mating surfaces in which the fabrication of a network of cooling grooves is made with relative ease. The cut pieces having one or more cooling grooves therein are then brazed together along the planar mating surfaces thereof. The planar mating surfaces simplify the brazing operation and improve the quality and durability of the bonding between the joined pieces. Although each of the mating planes in embodiments hereof is shown to be horizontally extending in parallel with a mounting flange of the split thread insert being produced, in other embodiments mating planes may be at angles other than horizontal orientation as long as the mating surfaces are substantially planar.

In an embodiment, the planar mating surfaces between cut pieces to be joined, such as mating surfaces 424a, 426a of upper and lower pieces 432a, 434a shown in FIG. 4, are cleaned, blasted and covered with flux with one piece of alloy foil positioned therebetween. The alloy foil is cut to follow a contour of the cut pieces, including the mounting holes for positioning dowel pins. As would be understood by one of ordinary skill in the art, preparation of the brazing foil requires clean and precise cutting techniques. In an embodiment, an automated cutting process is utilized to assure consistently accurate reproduction of piece profiles and clean edges of the foil. In accordance with such an embodiment, a laser cutter may be utilized to assure precise, consistently accurate cuts, as well as to also provide the clean environment needed for brazing. The integral structure of split thread inserts produced in accordance with embodiments hereof is achieved by a brazing joint produced between the planar mating surfaces of the cut pieces thereof.

Figure 15:
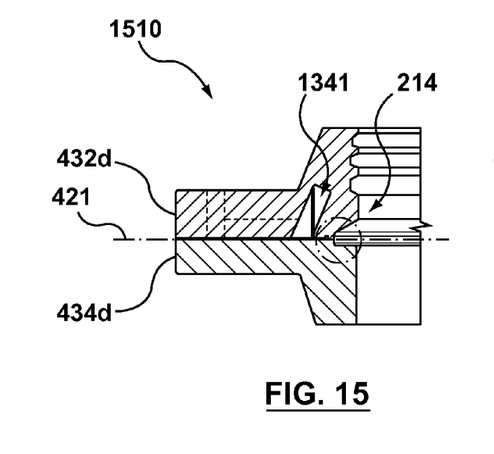
FIG. 15 depicts a sectional view of a split thread insert in accordance with another embodiment hereof having an angled cooling channel and a small venting gap.
Figure 15A:
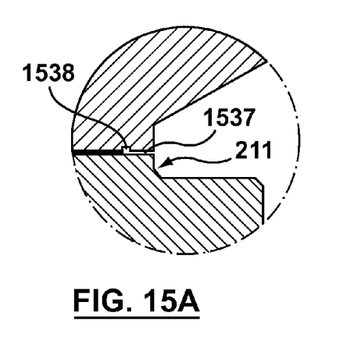
FIG. 15A depicts an enlarged view of the venting gap area of the split thread insert depicted in FIG. 15.

In an embodiment hereof, selected sections or areas of the mating surfaces may not be covered with foil so that the selected sections will not be brazed. Such un-joined areas of the mating surfaces may be used to create an artificial venting line on the molding surface. FIG. 15 depicts a sectional view of a split thread insert 1510 in accordance with another embodiment hereof having a cooling circuit that includes angled cooling channel 1341, as previously described with reference to the embodiment of FIG. 14. Split thread insert 1510 includes a small venting gap 1537, which is shown in FIG. 15A that depicts an enlarged view of the venting gap area of split thread insert 1510. Split thread insert 1510 having a mating plane 421 through molding surface 214 provides an additional advantage of venting the molding surface. When the brazing process for joining upper and lower pieces 432d, 434d is performed, a small area is left un-brazed, thereby serving as venting gap 1537. In an embodiment, an optional brazing barrier 1538 may be created by a groove, with or without protective film in the venting section, to prevent the flow of molten brazing alloy into venting gap 1537. In the embodiment shown in FIGS. 15 and 15A, venting gap 1537 is made along support ledge contour 211 of molding surface 214, which may prevent liquid brazing material from bleeding into the molding surface area during the brazing process. Accordingly, no hard brazing material reaches the molding surface, which alleviates the need for a finishing operation, and ensures production of a very high quality molding surface of the split thread insert.

In embodiments in accordance herewith, cooling channels may be manufactured with a variety of profiles, radially positions and angled configurations in order to accommodate different split thread insert sizes and for meeting the cooling requirements for certain locations of the molded part being formed therein. Further it should be understood by one of ordinary skill in the art that the brazing process described above is the preferred method of joining pieces that comprise a split thread insert in accordance with embodiment hereof but that this disclosure is by means of illustration and not limitation. As such pieces that comprise a split thread insert in accordance with embodiment hereof may be joined by various methods of permanently joining metals and other hard surfaces that provide the a similar secure and durable connection between the pieces as may be obtained by methods hereof.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A split thread insert comprising:
an upper piece having a curved groove formed in a mating surface thereof;
a lower piece having a corresponding curved groove formed in a mating surface thereof, wherein the upper and lower pieces are joined along their respective mating surfaces;
a flow diverter positioned between the curved grooves of the upper and lower pieces to form a cooling fluid channel, wherein the flow diverter directs a cooling fluid circulating in the cooling fluid channel to flow between the curved grooves of the upper and lower pieces,
wherein the flow diverter is positioned within the mating surface of one of the upper and lower pieces in a recess formed along curved edges of the curved groove therein such that the flow diverter has a flush surface with the mating surface within which it is recessed;

an inlet groove formed within the mating surface of the upper piece, wherein an inlet channel is formed when the upper and lower pieces are joined along their respective mating surfaces; and an outlet groove formed within the mating surface of the lower piece, wherein an outlet channel is formed when the upper and lower pieces are joined along their respective mating surfaces, wherein the outlet channel extends between an outlet bore and the curved groove in the lower piece, and wherein a cooling fluid simultaneously flows through openings at each end of the flow diverter into each end of the curved groove in the lower piece to flow therethrough and out of the outlet channel.

2. The split thread insert of claim 1, wherein the flow diverter is shorter than the cooling fluid channel such that each end of the flow diverter is spaced from a corresponding end of the cooling fluid channel to provide a respective opening therebetween through which the cooling fluid passes between the curved grooves of the upper and lower pieces.

3. The split thread insert of claim 1, wherein at least one of the curved grooves of the upper and lower pieces extends at an acute angle with respect to the mating surface thereof to have a trough portion positioned proximate of a molding surface of the split thread insert.

4. The split thread insert of claim 1, wherein the inlet channel extends between an inlet bore and the curved groove in the upper piece.

5. The split thread insert of claim 4, wherein when the cooling fluid is introduced into the curved groove in the upper piece from the inlet channel, the cooling fluid simultaneously flows to each end of the curved groove in the upper piece to traverse the respective opening at each end of the flow diverter.

6. A split thread insert comprising:

an upper piece having a curved groove formed in a mating surface thereof;

a lower piece having a corresponding curved groove formed in a mating surface thereof, wherein the upper and lower pieces are joined along their respective mating surfaces;

a flow diverter positioned between the curved grooves of the upper and lower pieces to form a cooling fluid channel, wherein the flow diverter directs a cooling fluid circulating in the cooling fluid channel to flow between the curved grooves of the upper and lower pieces, wherein the flow diverter is positioned within the mating surface of one of the upper and lower pieces in a recess formed along curved edges of the curved groove therein such that the flow diverter has a flush surface with the mating surface within which it is recessed;

an inlet groove formed within the mating surface of the lower piece that extends from an inlet bore to the curved groove in the lower piece, wherein an inlet channel is formed when the upper and lower pieces are joined along their respective mating surfaces; and an outlet groove formed within the mating surface of the upper piece that extends from an outlet bore to the curved groove in the upper piece, wherein an outlet channel is formed when the upper and lower pieces are joined along their respective mating surfaces, and wherein a cooling fluid introduced into the curved groove in the lower piece from the inlet channel simultaneously flows to each end of the curved groove in the lower piece to traverse a respective opening at each end of the flow diverter such that the cooling fluid simultaneously flows into each end of the curved groove in the upper piece to flow therethrough and out of the outlet channel.

7. A split thread insert comprising:

a first piece having a curved groove formed in a mating surface thereof;

a second piece having a corresponding curved groove formed in a mating surface thereof, wherein the first and second pieces are joined along their respective mating surfaces; and a flow diverter positioned between the curved grooves of the first and second pieces to form a cooling fluid channel, wherein a cooling fluid flows to each end of the curved groove in the first piece and traverses a respective opening at each end of the flow diverter to simultaneously flow into each end of the curved groove in the second piece to form a portion of a cooling circuit of the split thread insert.

8. The split thread insert of claim 7, wherein the flow diverter is positioned within the mating surface of the first piece in a recess formed along curved edges of the curved groove therein such that the flow diverter has a flush surface with the mating surface.

9. The split thread insert of claim 7, further comprising:

an inlet groove formed within the mating surface of the first piece that extends from an inlet bore to the curved groove in the first piece, wherein an inlet channel is formed when the first and second pieces are joined along their respective mating surfaces; and an outlet groove formed within the mating surface of the second piece that extends from an outlet bore to the curved groove in the second piece, wherein an outlet channel is formed when the first and second pieces are joined along their respective mating surfaces.

* * * * *